(12) United States Patent
Kovács et al.

(10) Patent No.: US 8,594,623 B2
(45) Date of Patent: Nov. 26, 2013

(54) SUBSCRIBER PORTFOLIO MANAGEMENT SYSTEM

(75) Inventors: László Kovács, Martonvásár (HU); Gábor Magyar, Kecskemét (HU); Laszlo Toka, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/357,917

(22) Filed: Jan. 25, 2012

(65) Prior Publication Data
US 2013/0189947 A1   Jul. 25, 2013

(51) Int. Cl.
*H04M 11/00* (2006.01)

(52) U.S. Cl.
USPC . 455/406; 455/405; 379/114.28; 379/114.03; 707/736; 707/737

(58) Field of Classification Search
USPC .............. 455/405, 406, 414.1, 560; 370/310, 370/352, 338, 401; 379/100.04, 379/114.01–114.12, 114.28; 709/223, 225; 707/736, 737
See application file for complete search history.

(56) References Cited

U.S. PATENT DOCUMENTS

| | | | |
|---|---|---|---|
| 5,790,643 A * | 8/1998 | Gordon et al. | 379/119 |
| 7,986,935 B1 | 7/2011 | D'Souza et al. | |
| 8,345,841 B2 * | 1/2013 | Karlsson et al. | 379/114.28 |
| 2002/0191595 A1 * | 12/2002 | Mar et al. | 370/352 |
| 2003/0013489 A1 * | 1/2003 | Mar et al. | 455/560 |
| 2003/0083968 A1 | 5/2003 | Marsh et al. | |
| 2007/0297585 A1 * | 12/2007 | Karlsson et al. | 379/114.28 |
| 2008/0013470 A1 * | 1/2008 | Kopplin | 370/310 |
| 2008/0256020 A1 * | 10/2008 | Wakefield | 707/1 |

(Continued)

FOREIGN PATENT DOCUMENTS

| | | |
|---|---|---|
| CA | 2625757 A1 | 9/2009 |
| EP | 1947832 A1 | 7/2008 |
| WO | 2004045142 A1 | 5/2004 |

OTHER PUBLICATIONS

LR Mobile News Feed. "Camiant Studies Mobile Data Rates." LR Mobile News Feed, Nov. 16, 2009, Retrieved from the internet: <http://www.lightreading.com/document.asp?doc_id=187889>.
Berge Ayvazian. "Optimize or Monetize Mobile Network Investments?" LR Mobile Column, Feb. 11, 2010, Retrieved from the Internet: <http://www.lightreading.com/document.asp?doc_id=184666>.
Opnet Telecom. "How Smart Operators are Closing the Mobile Data Revenue Gap." White Paper, 2012, pp. 1-10.

*Primary Examiner* — San Htun
*Assistant Examiner* — Nathan Taylor
(74) *Attorney, Agent, or Firm* — Coats & Bennett, P.L.L.C.

(57) ABSTRACT

A subscriber portfolio model is created by forming mutually exclusive and completely exhaustive groups of subscribers in a way that maximizes the intra-group similarity and inter-group dissimilarity of the value of a target attribute among subscribers in the groups. The subscriber groups thus generated are self-descriptive, as the groups are defined by the attributes used to form them. A segmenting algorithm groups subscribers along permutations of attributes. Relevant data about subscribers is collected from various sources, correlated, and subscriber identities removed to ensure privacy. After analyzing the aggregated data, a subscriber portfolio model is built. The subscriber portfolio model is created in an iterative process; in each step, a selected subscriber group is subdivided into smaller subscriber groups along different value ranges of a statistically decisive attribute that is selected and evaluated based on specific methods. The subdivision is performed by computing filtering conditions based on an in-depth statistical analysis.

26 Claims, 7 Drawing Sheets

(56) References Cited

U.S. PATENT DOCUMENTS

| | | |
|---|---|---|
| 2009/0320077 A1* | 12/2009 | Gazdzinski .................. 725/62 |
| 2010/0091763 A1* | 4/2010 | Thompson .................. 370/352 |
| 2010/0099393 A1* | 4/2010 | Brisebois et al. ............ 455/418 |
| 2010/0121960 A1* | 5/2010 | Baniel et al. ................. 709/228 |
| 2010/0304710 A1* | 12/2010 | Sharma et al. ............... 455/406 |
| 2011/0244826 A1* | 10/2011 | Krishnan et al. ............. 455/405 |
| 2011/0250865 A1 | 10/2011 | Breitzman et al. |
| 2011/0265109 A1* | 10/2011 | Goyet et al. .................... 725/9 |
| 2012/0046017 A1* | 2/2012 | Jennings ................... 455/414.1 |
| 2012/0084425 A1* | 4/2012 | Riley et al. .................... 709/223 |
| 2012/0330954 A1* | 12/2012 | Sivasubramanian et al. . 707/737 |

* cited by examiner

SUBSCRIBER PORTFOLIO MANAGEMENT SYSTEM

TECHNICAL FIELD

The present invention relates generally to wireless communication networks and in particular to a method and apparatus of subscriber management.

BACKGROUND

Mobile communications have become ubiquitous in many areas. In addition to the proliferation of subscribers, the capabilities, and hence data demands, of mobile devices (e.g., "smartphones") have skyrocketed. Higher data demands by increasing numbers of subscribers translates to dramatically increased traffic demands in wireless communication networks, requiring extensive capital investment to both upgrade and expand network equipment. However, network operators' revenue is not growing at the same rate. For example, one study estimates that bandwidth on 3G mobile networks is growing by approximately 400% annually while the associated revenue from data services is only growing approximately 40% per year.

Figure 1:
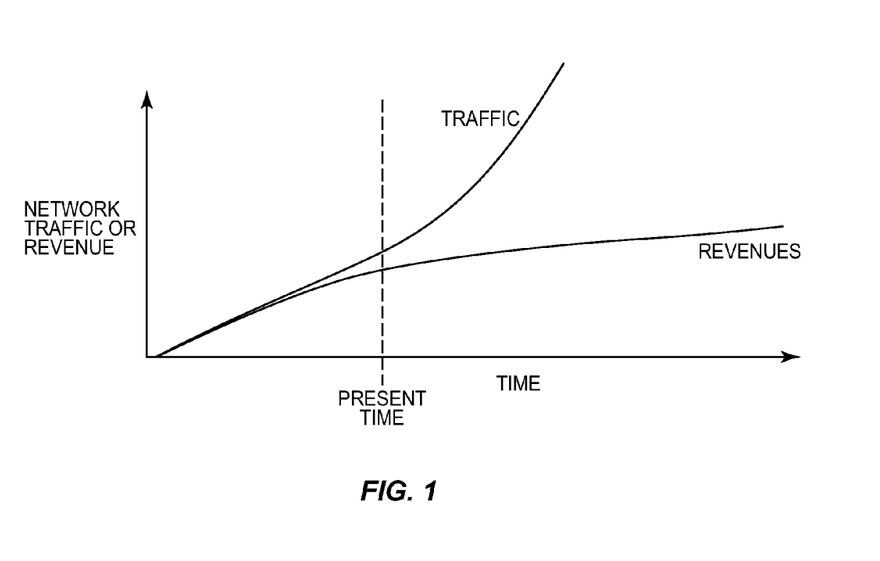
FIG. 1 is a graph relating wireless communication network traffic to network operator revenues over time.

FIG. 1 depicts a projection of network traffic vs. network operators' revenue over time, with the dashed line vertical bar representing the present time. A "revenue gap" already exists, and is projected to dramatically increase. Traditionally, only flat-rate tariffs have been applied for mobile data. This has only recently been changed. For example, different caps on monthly mobile data traffic have been introduced by some operators.

Both network operators and consumers understand that flat-rate tariffs are not sustainable, and advanced tariff systems are necessary for operators to support current and future data traffic. These tariff systems must account for the network resources actually used, such as total traffic or available bandwidth, into the price of the tariff plans. The key question is how these tariff systems should be formed in order to be simple and understandable for subscribers and capable of reflecting resource consumption in the tariffs adequately. Furthermore the tariffs must be monitored and in some cases redesigned periodically since new smartphone apps and hence usage patterns appear every day, changing the ecosystem. Several approaches have been tried, with only limited success. These include traffic shaping; segmentation of subscribers and differentiated tariffs; and individual database queries.

Traffic shaping is the practice of limiting bandwidth under certain circumstances. Certain identified traffic flows are marked as less desirable, and the network resources allocated to deliver that traffic are limited. The shaping can be of various types, such as shaping the traffic of the user (bandwidth limitation) after reaching a certain limit; or shaping the traffic of an intrusive application (e.g., P2P) in the peak usage hours or beyond. Shaping decisions need sophisticated equipment and policy control, and "fairness" is always a key issue which is typically hard to provide.

Traffic shaping is disadvantageous in many situations. For example, by shaping bytes (i.e., restricting bandwidth) of a subscriber who is willing to pay extra fees for the bandwidth, the operator can lose potential revenue. As another example, traffic shaping applied to a specific application (e.g. P2P) may restrict bandwidth to subscribers who otherwise have relatively small total traffic demands, raising a fairness issue. Furthermore, applications that can have harmful traffic patterns can change. Thus, tracking of application behavior is necessary; for example, on-line video traffic is currently a very resource-consuming application, but shaping is not an applicable answer as bandwidth limitation dramatically reduces the user-perceived quality. Finally, when network utilization is low, traffic shaping may become unnecessary regardless of the former behavior detected for the subscriber or of the application type in question.

Another approach to tariff design is to perform segmentation of subscribers, to analyze the main types of behavior, and apply different tariffs to the different segments. This approach attempts to balance network utilization and prices for the specific usage patterns of identified segments of subscribers. In user segmentation, the "footprint" of each subscriber is extracted from the available data in the network (activity profile, locations, mobility, traffic patterns, billing information, socio-demographic data, financial history, and the like) and analyzed to form groups of subscribers with similar profiles. Understanding the groups will then lead to the tariff decisions of the operator.

To be effective, segmentation should meet two main criteria: similar subscribers should be in the same group, and subscribers within different groups should be dissimilar from each other. The difficulty in segmentation approaches to tariff design comes from understanding the formed segments. The operator does not get a simple description of the formed segments but rather a set of subscriber identifiers with all their footprint data. This raises significant privacy issues. Furthermore, it is not at all clear how the subscriber data in a segment leads to a proper tariff. An intermediate step is necessary in which the network operator attempts to discover the reasons (if such a simple set of reasons even exists) for each segment—that is, why are the subscribers in that segment are grouped together? These reasons can be then translated to tariffs tailored to each segment.

Still another approach to innovative tariff design involves network operators building their own databases for subscriber portfolio management, and performing individual database queries on the collected data to support business related decisions. These queries, however, will only slice a small piece of the subscriber base. Without taking special care on some target variable related to cost and revenue issues, these queries will not ensure that the selected subscriber group will have any meaning with respect to subscriber portfolio management. In addition, with repeated queries it is not trivial at all that the subsequent results can give a complete and mutually exclusive description of the whole subscriber set, even if one individual query may yield a meaningful subscriber group.

A problem common to segmentation and database queries—indeed, to any tariff design that is based on analysis of actual subscriber usage patterns—is privacy. Subscribers are sensitive to network operators collecting extensive data about their usage patterns (e.g., websites visited, videos downloaded, apps utilized, and the like). In many jurisdictions, such data collection and analysis may run afoul of privacy laws or regulations. Furthermore, the potential exists that the data may be leaked, sold, or otherwise exploited, exposing operators to liability for, e.g., identity theft. Thus, ideally, innovative tariff schemes based on subscriber footprints should only access anonymized usage records, from which subscriber identities have been removed.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments described and claimed herein, a subscriber portfolio model is created by forming mutually exclusive and completely exhaustive groups of subscribers in a way that maximizes the intra-group similarity and inter-group dissimilarity of the value of a target attribute among subscribers in the groups. The subscriber groups thus generated are self-descriptive, as the groups are defined by attributes used to form them. A segmenting algorithm groups subscribers along permutations of attributes, with the selected groupings based on the values of a target attribute. Relevant data about subscribers is collected from various sources, correlated, and subscriber identities removed to ensure privacy. After analyzing the aggregated data, a subscriber portfolio model is built. The subscriber portfolio model is created in an incremental way during an iterative process, where in each step, a selected subscriber group is subdivided into smaller subscriber groups along different value ranges of a statistically decisive attribute that is selected and evaluated based on specific methods. The subdivision is performed by computing filtering conditions based on an in-depth statistical analysis.

One embodiment relates to a method of creating a subscriber portfolio model of subscribers of a mobile communication network operator. The subscriber portfolio model comprises a plurality of mutually exclusive and completely exhaustive groups of subscribers. The groups exhibit high intra-group similarity and inter-group differences with respect to a target attribute. Each group is self-descriptive by the attributes used to create the groups. A subscriber profile record associated with each subscriber is obtained. The subscriber profile record comprises a plurality of attribute/value pairs. A target attribute is selected from the attributes common to all subscriber profile records. The subscriber portfolio model is initialized to include a single initial group comprising all subscribers. The following steps are iteratively performed: selecting a working group from the subscriber groups in the subscriber portfolio model by applying a search algorithm; for each attribute that is common to all subscriber profile records in the working group, subdividing the working group into subgroups along the attribute, calculating a gain function reflecting the intra-group similarity and the inter-group differences of subscribers in the subgroups with respect to the values of the target attribute, and saving the results; and if the subgroups formed using the attribute that yielded the highest gain function meet a predetermined split criteria, replacing the working group in the subscriber portfolio model with the subgroups; until the subscriber portfolio model meets predetermined stop criteria.

Another embodiment relates to a network operator analysis station operative to create a subscriber portfolio model of subscribers of a mobile communication network operator. The subscriber portfolio model comprises a plurality of mutually exclusive and completely exhaustive groups of subscribers. The groups exhibit high intra-group similarity and inter-group differences with respect to a target attribute. Each group is self-descriptive by the attributes used to create the groups. The analysis station includes memory operative to store subscriber profile records and memory operative to store a subscriber portfolio analysis program. The analysis station also includes a network interface operative to collect subscriber information from one or more network nodes. The analysis station further includes a processor. The processor is operative to obtain a subscriber profile record associated with each subscriber, the subscriber profile record comprising a plurality of attribute/value pairs; select a target attribute from the attributes common to all subscriber profile records; and initialize the subscriber portfolio model to include a single initial group comprising all subscribers. The processor is further operative to iteratively perform the steps of selecting a working group from the subscriber groups in the subscriber portfolio model by applying a search algorithm; for each attribute that is common to all subscriber profile records in the working group, subdividing the working group into subgroups along the attribute, calculating a gain function reflecting the intra-group similarity and the inter-group differences of subscribers in the subgroups with respect to the values of the target attribute, and saving the results; and if the subgroups formed using the attribute that yielded the highest gain function meet a predetermined split criteria, replacing the working group in the subscriber portfolio model with the subgroups; until the subscriber portfolio model meets predetermined stop criteria.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 2:
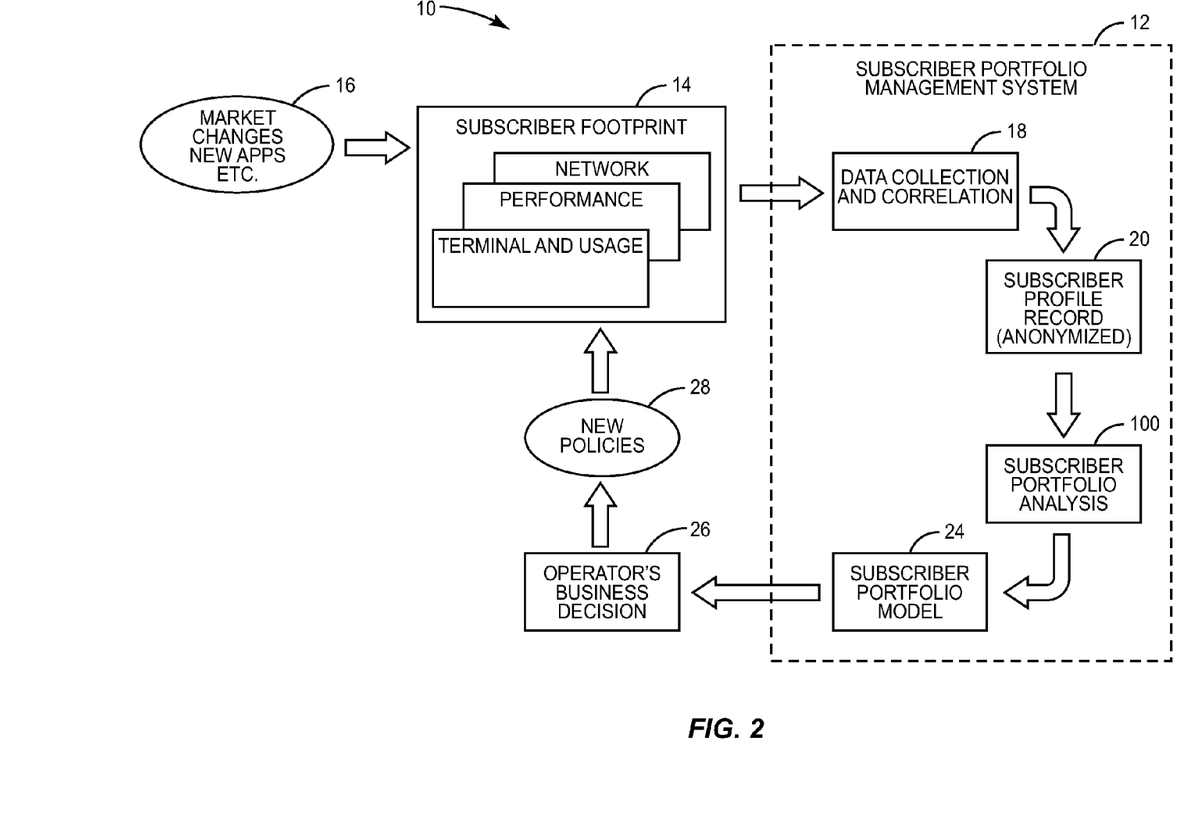
FIG. 2 is a functional flow diagram of a method of network management.

FIG. 2 depicts an overview of a network management and tariff-setting system 10 based on a subscriber portfolio management system 12. The subscriber portfolio management system 12 provides a new form of subscriber group description: a complete set of mutually disjoint subscriber groups are defined by filtering conditions applied on subscriber attributes in such a way that the values of a selected target attribute within a subscriber group are similar to each other. The subscriber portfolio management system 12 is based on an analysis of subscriber footprints 14, which include information such as network resources usage, performance factors, mobile terminal type and usage patterns, and the like. Subscriber footprints are constantly changing, as indicated at 16, as new apps proliferate, new technologies develop, the popularity of, e.g., certain social media sites wax and wane, and the like. Accordingly, the system 10 is dynamic, and constantly updates itself.

The subscriber portfolio management system 12 extracts subscriber footprint 14 data in a data collection and correlation process 18. Processing of this data generates a subscriber profile record 20 for each subscriber. The subscriber profile record 20 includes traffic, performance, anonymized subscriber, and other information in the form of attribute-value pairs. A subscriber portfolio analysis process 100 analyzes the subscriber profile records 20, and groups the subscribers into a plurality of mutually exclusive and completely exhaustive subscriber groups. These groups exhibit both high intra-group similarity and inter-group differences with respect to a target attribute. The division of subscribers generates a subscriber portfolio model 24. The subscriber groups in the subscriber portfolio model 24 are self-descriptive by the attributes used to create the groupings. That is, no interpretive step is necessary to try to understand the grouping; it is defined by the attributes that cause the group to be formed.

The network operator's business decision 26 relies on the subscriber portfolio model 24 to craft tariffs and policies 28 for subscribers. The implementation of these tariffs and policies 28 have a further effect on subscriber behavior, thus modifying the subscriber footprint 14. By continuously (or periodically) updating the subscriber portfolio model 24 by executing the subscriber portfolio management system 12, the real-world effect of both market changes 16 and network operator policies 28 are captured, and the subscriber portfolio model 24 optimized to reflect their effect. This provides the network operators valuable insight into the realities of network utilization, in a manner that is self-descriptive and hence easy to understand and utilize, while protecting subscriber privacy. The constituent elements and processes of the subscriber portfolio management system 12 are now described in greater detail.

Subscriber Profile Record

The subscriber profile record 20 is a collection of data that describes an individual's behavior and character as a subscriber. The subscriber profile is created by measuring, collecting and correlating information coming from different data sources, such as network node logs and configurations, performance reports, deep packet inspection modules, subscription information, and the like. Representative information that may be included in a subscriber profile record 20 comprises measured traffic attributes, performance related issues, subscriber information, and personal information.

Measured traffic attributes may include attributes such as data traffic volume, visited geographic location(s), temporal distribution of data traffic over a specific time period, and composition of data traffic (e.g., video content, web browsing, email, social networking, and the like). Performance related issues may include attributes such as experienced access technology (e.g., 2G, EDGE, 3G, HSDPA, HSUPA, HSPA+, LTE, and the like), and experienced performance measured through end-to-end (E2E) key performance indicators (KPIs). Subscriber information may include attributes such as properties of user equipment (UE) (e.g., screen size, launch date, operating system, and the like); capabilities of UE, such as access technology; and subscription plan (e.g., monthly fee and traffic cap, Quality of Service (QoS), duration of agreement, and the like). Personal information may include anonymized attributes such as gender, age, and the like. In one embodiment, the subscriber profile record 20 is a collection of attribute-value pairs.

The subscriber profile record 20 does not contain any identifier that directly relates to the underlying person, thus the subscriber identifiers are anonymized, yielding an undecodable mapping of the subscriber's identifier to its identity.

Subscriber Group

A subscriber group is a group of subscribers formed by the subscriber portfolio analysis process 100. Subscribers in a group inherently have—as a product of the subscriber portfolio analysis process 100—very high similarity of attributes selected from the subscribers' profile records 20, with respect to the value of a target attribute. Similarly, subscribers in different groups have a low similarity of selected attributes, with respect to the value of the target attribute. Furthermore, the definition of the group comprises a list of the attributes that formed the group selection; hence, the groups are inherently self-descriptive and thus easy to understand. Stated differently, subscriber group is a collection of attributes and their values (or respective value ranges) that describe a group of subscribers by being equal to (or respectively by containing) the values of the respective attributes of the included subscribers' profile records. The description of a subscriber group is made by a set of exact filtering conditions applied to some of the underlying subscriber profile records' attributes. Note, that subscriber identities are not needed for the creation of subscriber groups, only their profile records.

Target Attribute

A specific key attribute (or combination of attributes) in the subscriber profile record 20 is referred to as the target attribute. The target attribute plays a central role in the subscriber portfolio analysis 100: the similarity of subscribers grouped into the same subscriber group, and the dissimilarity of subscribers grouped into different subscriber groups, are generally manifested in the target attribute. The target attribute must have a numeric value.

Figure 3:
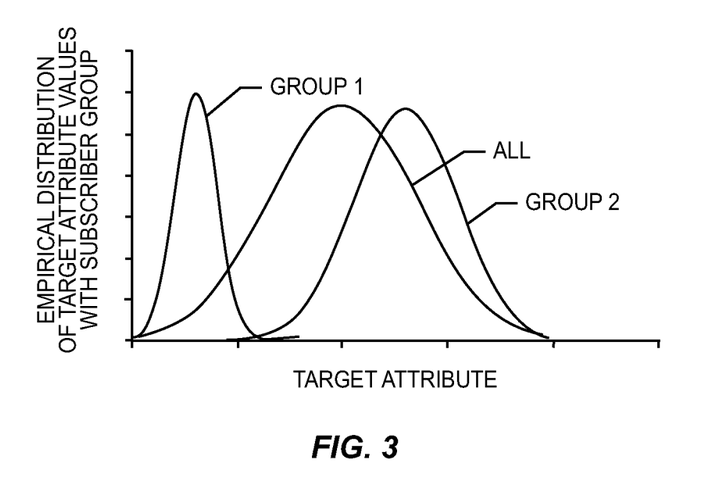
FIG. 3 is a graph depicting the division of a subscriber base into two groups showing discrimination in the value of a target attribute.

FIG. 3 depicts a representative graph of the probability distribution of target attribute values for all subscribers, and that of two subscriber groups formed from the set of all subscribers by the subscriber portfolio analysis 100. By appropriate grouping of the subscribers, the variance of their target attributes decreases within the groups, compared to the all of the subscribers considered together. Thus, FIG. 3 depicts that similar subscribers are discovered (with respect to values of the target attribute) within each of GROUP 1 and GROUP 2. Also, the subscribers in the two groups are different with respect to values of the target attribute. As will be elaborated more fully herein, this discrimination and grouping along an attribute, and with respect to values of the target attribute, is the basis for the grouping of subscribers in the subscriber portfolio management system 12.

Subscriber Portfolio Model

The subscriber portfolio model 24 is a collection of distinct subscriber groups, giving a compact and understandable descriptor of the most important subscriber attribute combinations that have significant effect on the expected value of the target attribute. The subscriber portfolio model 24 typically covers all subscribers: the set of subscriber groups are mutually exclusive and completely exhaustive.

Subscriber Portfolio Analysis

Figure 4:
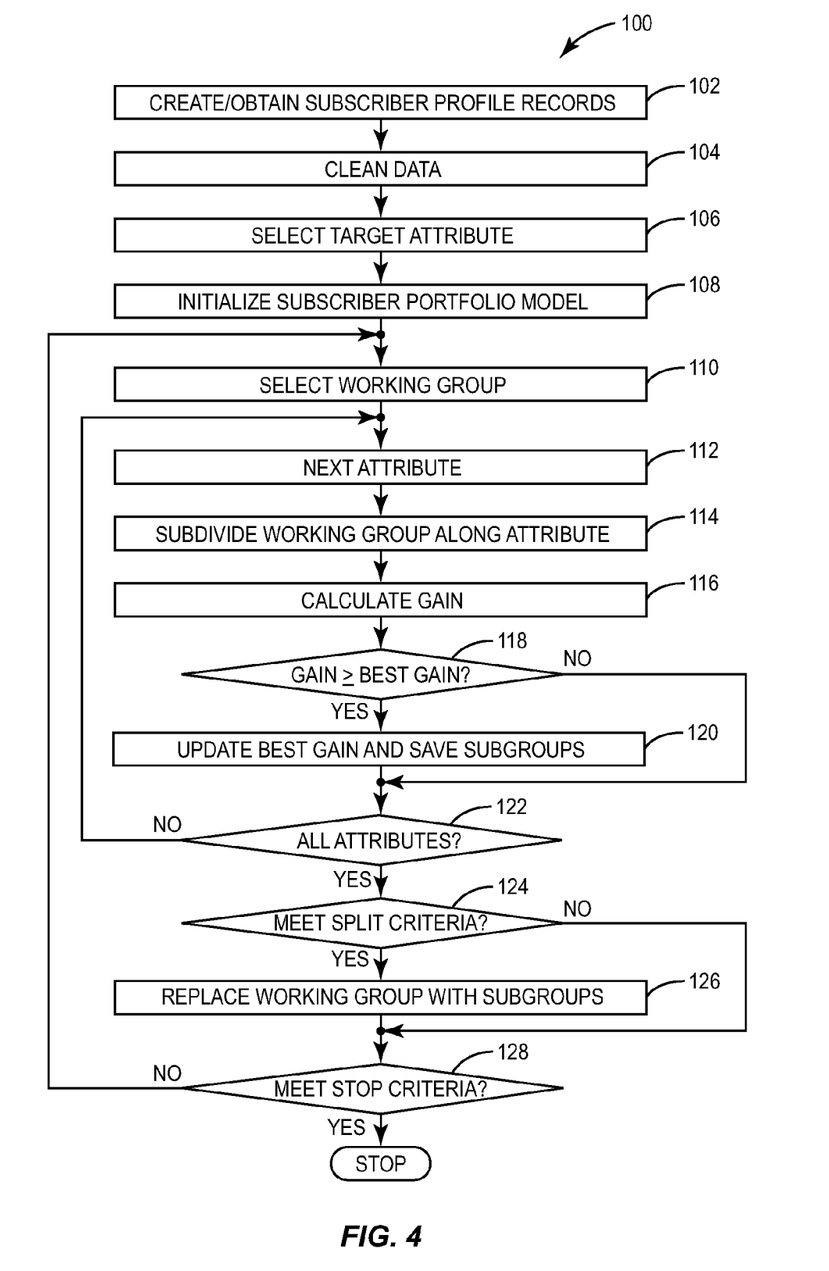
FIG. 4 is a flow diagram of a method of subscriber portfolio analysis.

A method 100 of subscriber portfolio analysis is depicted in FIG. 4, the steps of which are described in detail herein. Preliminarily, however, a brief overview of the method 100 is provided. The method 100 of subscriber portfolio analysis consists in dividing a group of subscribers (initially, the universe of all subscribers) into two or more sub-groups. The criteria for the division is an attribute, selected from the subscriber profile record 20, common to all subscribers in the group. The division is made according to how well the attribute divides subscribers in the group as measured by the effect on the target attribute. A "good" attribute for division is one that generates disjoint sub-groups, as depicted in FIG. 3.

One scheme for selecting an attribute for division of a group is to test every attribute that is common to all subscribers in the group. That is, all possible permutations of sub-groups are created and the sub-groups are analyzed for "gain," defined as a measure of intra-group similarity and inter-group difference with respect to the value of the target attribute. These data are stored at each iteration (i.e., for each attribute). When all attributes have been tested, the attribute giving rise to the sub-groups having the greatest gain is selected, and the group is divided into two or more sub-groups along the selected attribute. These "sub-groups" then become "groups" in the model, and the process repeats until stop criteria are met. As discussed more fully herein, an attribute may be numeric (Le., screen size measured in inches) or nominal (i.e., access technology, such as GSM or LTE). Different methods are presented for division along either type of attribute.

One simplified example definition of a subscriber group formed by the subscriber portfolio analysis 100 is provided in the following table. The first row contains the name of an attribute selected for division of a parent group, and the second row contains the filtering condition for the attribute.

| UE network capability | UE screen size | Monthly subscription fee/monthly traffic (target attribute) |
| --- | --- | --- |
| HSDPA | >3.7 in. | $0.40/MB |

Note that this group is self-defining. No analysis or interpretation is necessary to see that subscribers with HSDPA capability and large screens exhibit very similar behavior with respect to the ratio of their monthly fee to the traffic they consume in a month. Furthermore, non-HSDPA users and users with smaller screen sizes exhibit different behavior with respect to this target attribute value. For example, it could be that users having UE with these capabilities watch more video than users with different UE. Whatever the underlying reason, the grouping of these users informs the network operator that these subscribers are similar in what they pay for the bandwidth actually consumed. Hence, special tariffs (e.g., discounts, promotions, surcharges) may be crafted and applied exclusively to this group.

Referring back to FIG. 4, the method 100 of subscriber portfolio analysis is described in detail. Initially, for each iteration of the method 100, the subscriber portfolio records 20 are accessed (block 102). The subscriber profile is built from the data measured in the network of the operator (e.g., traffic data and performance data) and from the subscriber records from the internal databases of the operator (e.g., subscription plan, UE capabilities and properties). The data collected from different sources is correlated together based on the matching subscriber identifier, in order to provide an integrated view of the subscriber's attributes. After the subscriber profile records 20 have been formed, subscriber identifiers are removed to ensure privacy.

The subscriber profile records 20 may require pre-processing steps, or cleaning (block 104). In one embodiment, the subscriber profile records 20 are filtered or complemented due to missing data. In one embodiment, one or more unnecessary attributes that exhibit inference with other attributes (i.e., strong correlation) are removed. In one embodiment, derived attributes are created (e.g., average and variance calculations of specific attributes). The data cleaning step 104 delivers processed input data for further analysis in order to avoid any misconception due to corrupted raw data.

A target attribute is selected (block 106). The target attribute must have a numeric value, and the same target attribute must be used throughout the subscriber portfolio analysis method 100. The target attribute may be selected in several ways, depending on the focus of the analysis. Two representative cases are described in detail: modeling traffic and modeling revenue per traffic. In one embodiment, the target attribute is the total traffic of the subscriber in a given time period (i.e., week, month, etc). This model focuses on the cost side of the subscriber base. In another embodiment, the target attribute is the subscriber's payment divided by the total traffic of the subscriber in a given time period (i.e., week, month, etc.). This model focuses on the relative profitability side of the subscriber base.

The subscriber portfolio model 24 is initialized for analysis by grouping all subscribers into one group (block 108).

A working group is selected (block 110). Numerous search algorithms may be employed—e.g., depth-first search. This step chooses one working group out of the existing set of the groups for further subdivision into smaller subscriber groups. Initially, of course, there is only one group available for selection (consisting of all subscribers).

An attribute is selected, along which to divide the working group (blocks 112-122). The attribute selection process comprises actually dividing the working group numerous times, along different attributes, and analyzing the resulting sub-groups. The key to the analysis of the different sets of sub-groups is calculating and comparing a measure of intra-group similarity and the inter-group difference referred to herein as a gain.

An attribute common to all subscribers in the working group is selected (block 112). The working group is then divided along the selected attribute (block 114), with respect to the value of the target attribute. The division process differs depending on whether the selected attribute is a numeric or nominal type.

If the selected attribute is a nominal type—that is, the possible values of the attribute comprise a set of distinct values—then initially the working group is divided into as many sub-groups as the number of different values of the selected nominal attribute. The largest (i.e., statistically most reliable) unmerged subgroup is selected. Each of the other sub-groups is then evaluated to ascertain whether it exhibits a statistically similar distribution of values of the target attribute. In one embodiment, a Student's t-test algorithm is used for this calculation. If a strong correlation is found, the two sub-groups are merged. This process is iteratively performed until no more groups can be joined, due to dissimilarity in distribution of values of the target attribute. In the final iteration, the small untouched sub-groups created in the initial stage are merged with a large subgroup that has the closest target attribute average.

Figure 5:
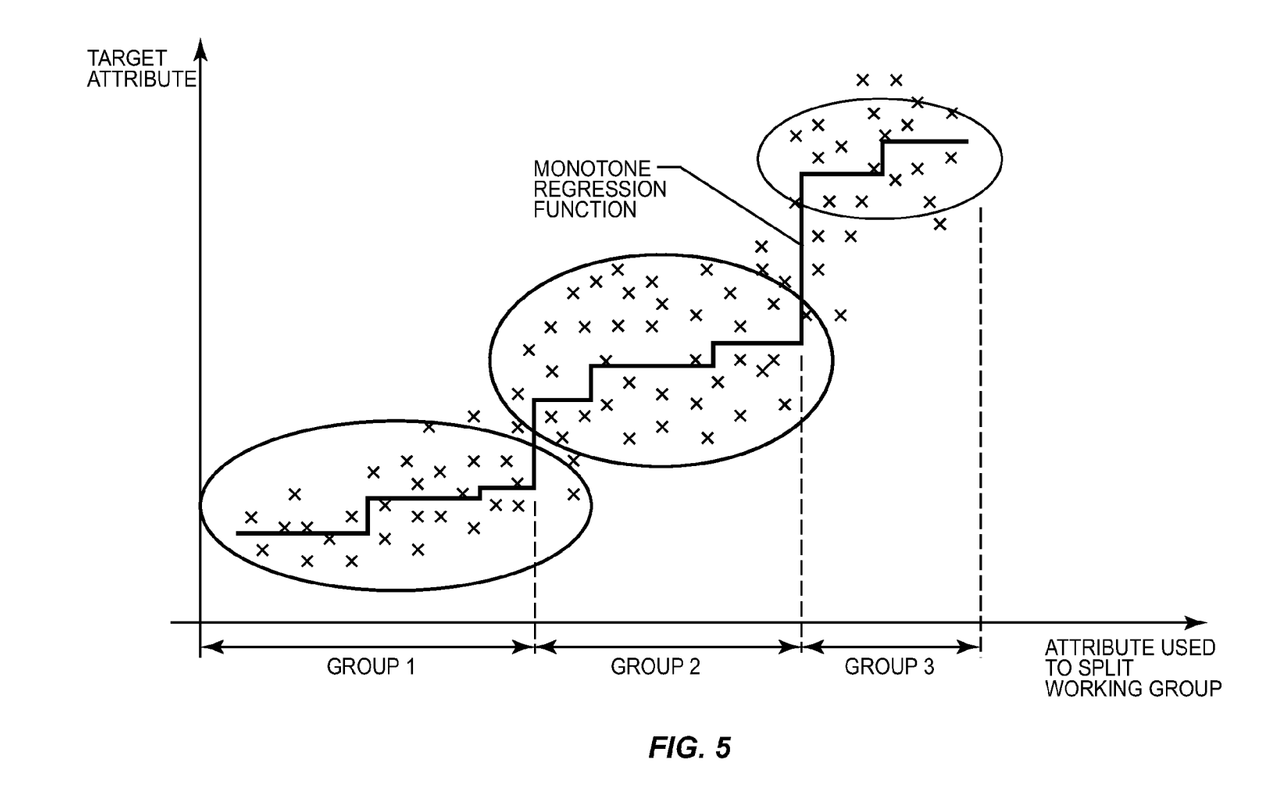
FIG. 5 is a graph depicting the sub-grouping of subscribers along a selected numeric attribute.

If the selected attribute is a numeric type, the subscribers are first sorted along the increasing or decreasing values of the selected numeric attribute. A monotone regression of the target attribute along this numeric attribute is estimated based on standard regression algorithms, as depicted in FIG. 5. Initially, all the intercepts (i.e., elements of the step function) will be treated as sub-group separator points, and as many sub-groups will be created as the number of steps. In subsequent iterations, the sub-groups are merged pair-wise in the same way described above for nominal attribute type sub-group merging, with the additional constraint that only neighboring sub-groups can be merged together. This process continues until a small set of groups are defined, separated by a set of splitting points along the numeric attribute's range.

Once a working group has been divided into sub-groups along the selected attributes (block 114), the gain is calculated (block 116). The gain is a measure of the degree to which the target attribute values within a sub-group are similar, and the averages of the target attribute values of different sub-groups are different. The gain may be calculated in several ways, depending on the goal of the analysis.

In one embodiment, the gain function is a "balanced sizes" gain function, in which the score of similarity within sub-groups and the low number of sub-groups are balanced. By this approach the sizes of sub-groups become relatively large, thus the yielded portfolio model diversity is not too high. On the other hand, the subscriber sub-groups will contain fairly different subscribers in terms of the target attribute. The balanced sizes gain function is defined as:

$$g = \sqrt{\frac{\sum_{i=1}^{I} n_i(m_i - m_p)^2}{n_p}} \text{ where}$$

$$m_i = \frac{1}{n_i}\sum_{j=1}^{n_i} t_{i,j}$$

is the average of the target attribute values in the $i^{th}$ sub-group;

$m_p$ is the average of the target attribute values in the parent group; and $n_i$, $n_p$ are the number of samples within the $i^{th}$ sub-group and the parent group, respectively.

In another embodiment, the gain function is an "extreme differences" gain function, in which the score of similarity within sub-groups receives higher priority than the low number of sub-groups or the large size of each sub-group. Use of the extreme differences gain function leads to a subscriber portfolio model 24 in which the subscribers are classified into a possibly large number of groups in each step, where the groups themselves are very homogeneous and differ from each other to a large extent. The extreme differences gain function is defined as:

$$g = \sqrt{\frac{\sum_{i=1}^{I}(m_i - m_p)^2}{n_p}} \text{ where}$$

$$m_i = \frac{1}{n_i}\sum_{j=1}^{n_i} t_{i,j}$$

is the average of the target attribute values in the $i^{th}$ sub-group;

$m_p$ is the average of the target attribute values in the parent group; and $n_i$, $n_p$ are the number of samples within the $i^{th}$ sub-group and the parent group, respectively.

Whichever gain function is utilized, the gain is calculated for the sub-groups formed using the selected attribute (block 116). For iterations other than the first, the gain is compared to the best gain yet achieved in splitting the working group (block 118). If the gain of the current working group division exceeds the best gain achieved so far (or if this is the first split of the working group), the best gain, the selected attribute, and the sub-groups generated are saved (block 120). If the gain of the current working group division is less than a previously achieved gain (block 118), the current data are not saved. In either case, if the list of attributes common to all subscribers in the working group has not been exhausted (block 122), the next attribute is selected (block 112) and another division is performed (block 114) and analyzed (block 116). This process proceeds until the working group has been split along all attributes (block 122).

If the selected division of the working group satisfies a predetermined split criteria (block 124), then the working group is replaced with the plurality of sub-groups (block 126), which become subscriber groups in the subscriber portfolio model 24. In one embodiment, the split criteria is a comparison of the highest gain function result for the working group to a threshold value; if there is not a sufficient increase in gain, the working group should remain in the subscriber portfolio model 24 without being divided. Other analyses may also be performed. In one embodiment, a measure of clustering is used, such as the sum of mean squared errors of target attributes within a group compared to the group's average (small variance). In one embodiment, the size of the group itself is compared to a threshold value (e.g., it may be too small to be subdivided).

Similarly, predetermined criteria are applied to determine when to terminate the subscriber portfolio analysis method 100 (block 128). If it is determined that sufficiently large groups, and/or groups that are sufficiently heterogeneous with respect to the target attribute value, remain in the subscriber portfolio model 24, then another working group is selected for analysis and possible division (block 110). The next group may be one of the newly-created groups, or a different group in the subscriber portfolio model 24.

Figure 6:
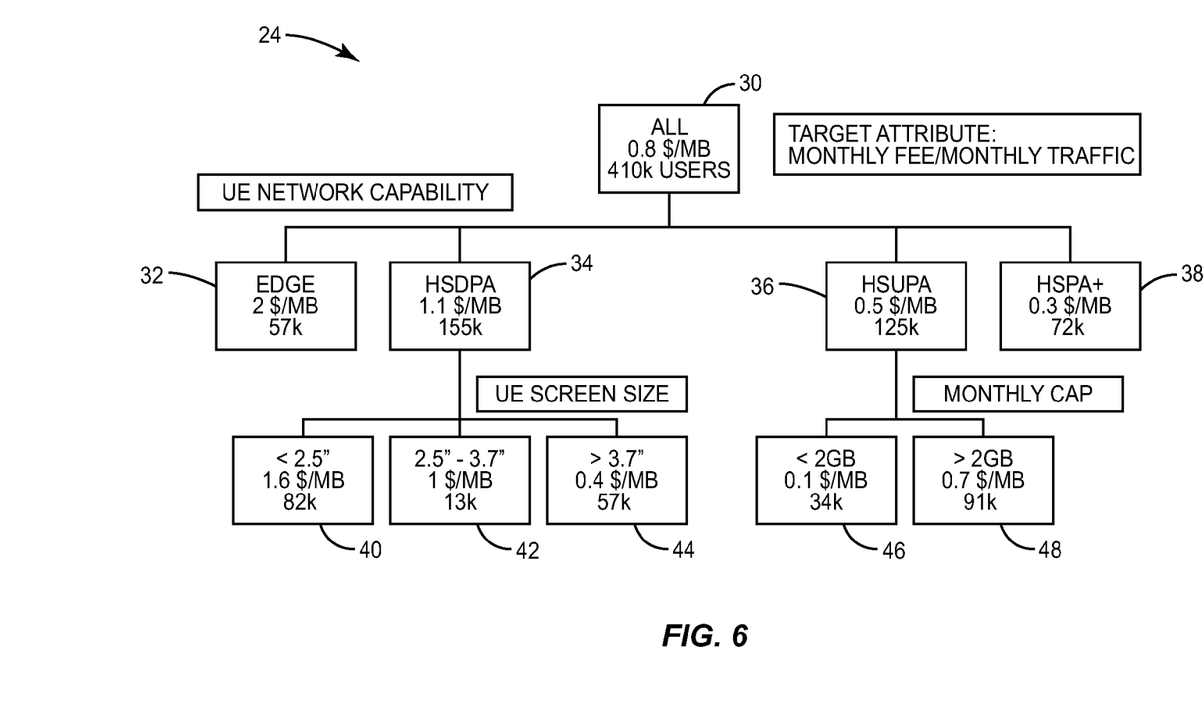
FIG. 6 is a representative subscriber portfolio model in the form of a tree graph.

The subscriber portfolio analysis method 100 thus generates a subscriber portfolio model 24 having a tree structure, a simplified example of which is depicted in FIG. 6. The target attribute for this subscriber portfolio model 24 is MONTHLY FEE/MONTHLY TRAFFIC. Each block in the tree was a working group at some point in the subscriber portfolio analysis method 100. The blocks depict the values of the selected attribute at each working group division, the average value of the target attribute of subscribers in the group, and the number of subscribers in the group. At the root is a group 30 comprising the entire subscriber base of 410,000 subscribers.

In this example, a first division of this group was made using the nominal attribute UE NETWORK CAPABILITY. This yields groups having attribute values of EDGE 32, HSDPA 34, HSUPA 36, and HSPA+ 38, within each of which the values of the target attribute are similar. The EDGE and HSPA+ groups 32, 38 are "leaves" in the tree—that is, the subscriber portfolio analysis method 100 determined that, e.g., no significant increase in gain was possible by further dividing these subscriber groups 32, 38, or that they were of a small enough size (57,000 and 72,000 subscribers, respectively). On the other hand, both the HSDPA 34 and HSUPA 36 groups (containing 155,000 and 125,000 subscribers, respectively) were further divided.

In the case of the HSDPA group 34, the attribute yielding the greatest gain was UE SCREEN SIZE; for the HSUPA group 36, the MONTHLY CAP attribute yielded the highest gain. Accordingly, smaller groups 40-48 were created from these groups, dividing the groups 34, 36 along values of the selected attributes, in such a way to maximize the intra-group similarity and inter-group differences of the value of the target attribute MONTHLY FEE/MONTHLY TRAFFIC.

The subscriber groups in the resulting subscriber portfolio model 24 are thus self-descriptive, and make certain relationships readily apparent that may not be uncovered by prior art methods of subscriber profile analysis. For example, subscriber group 40 includes subscribers with HSDPA-capable UEs having a small screen size. This is a profitable group; they pay four times as much for the same traffic volume as the largest screen HSDPA subscribers (group 44), and there are 40% more of them. Based on this information, the network operator may decide to increase the fees charged to subscribers in group 44. Similarly, subscribers having HSUPA-capable UEs and low monthly caps are less profitable than those with higher monthly caps; the network operator may decide to increase the cap on these subscribers, and charge a higher monthly fee. As another example, the EDGE subscribers in group 32 are good revenue generators; however their phones are older, and the network operator is not likely to upgrade capacity for them. As these examples illustrate, the subscriber portfolio model 24 according to embodiments of the present invention generates subscriber groups that are self-descriptive by the attributes used to divide the groups at various points in the subscriber portfolio analysis 100. As such, they are easy to understand, and provide immediately useful information to help network operators set tariffs and policies.

Since the subscriber portfolio analysis 100 is ideally run fairly often, the subscriber profile records 20 reflect subscribers' current footprints 14 (see FIG. 2), which constantly change, based on new apps and market changes 16. Hence, the subscriber groups generated are not only self-descriptive, they also reflect the current reality of traffic in actual networks, allowing network operators to stay on top of the latest developments and trends.

Figure 7:
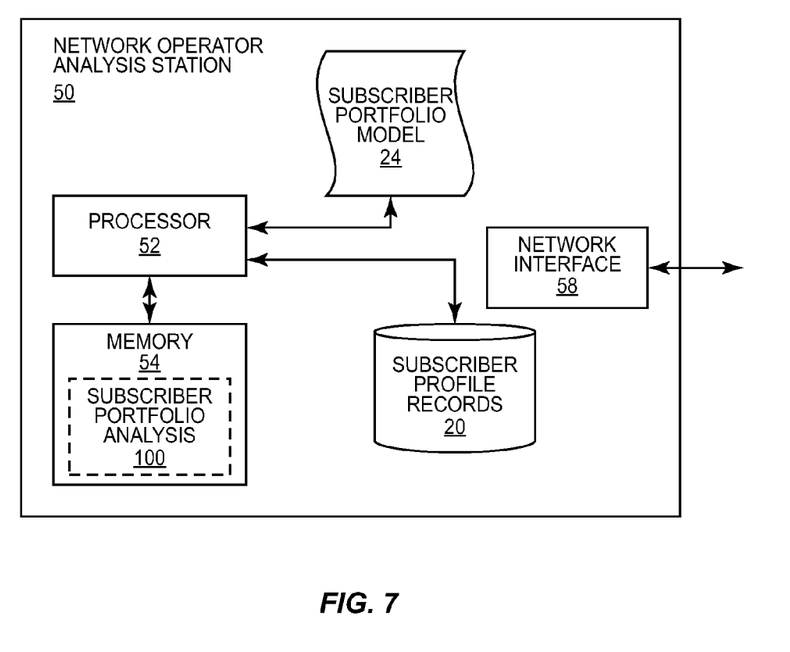
FIG. 7 is a functional block diagram of a network operator analysis station.

FIG. 7 depicts a network operator analysis station 50 suitable for executing the subscriber portfolio analysis method 100. The analysis station 50, which may comprise a computer or server connected to the communication network, includes a processor 52, memory 54, and network interface 58.

The processor 52 may comprise any sequential state machine operative to execute machine instructions stored as machine-readable computer programs in the memory 54, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 54 may comprise any nontransient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like. The memory 54 is operative to store operating system and other software (not shown) for execution by the processor 52. The memory may additionally store software operative to cause the analysis station 50 to execute the subscriber portfolio analysis method 100. The memory 54, or separate memory or a separate device (not shown) may also include a database operative to store the subscriber profile records 20, for use by the subscriber portfolio analysis method 100.

In operation, the processor 52 may control the network interface 58 to access data from which to build subscriber profile records 20. Alternatively, the processor 52 may access the subscriber profile records 20 from an external database via the network interface 58. The processor 52 is operative to execute the subscriber portfolio analysis method 100, as described herein. The processor 52 is further operative to generate and output one or more subscriber portfolio models 24, in the form of textual or graphic representation output to a display or printer, or transmitted via the network interface 58 to a remote location or entity.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a network operator analysis station, of creating a subscriber portfolio model of subscribers of a mobile communication network operator, the subscriber portfolio model comprising a plurality of mutually exclusive and completely exhaustive groups of subscribers, the groups exhibiting high intra-group similarity and inter-group differences with respect to a target attribute, and wherein each group is self-descriptive by the attributes used to create the groups, comprising:

obtaining a subscriber profile record associated with each subscriber from at least one network node, the subscriber profile record comprising a plurality of pairs, each pair comprising an attribute and a value;

selecting a target attribute from the attributes common to all subscriber profile records;

initializing the subscriber portfolio model to include a subscriber group comprising all subscribers; and iteratively performing the steps of selecting a working group from the at least one subscriber group in the subscriber portfolio model by applying a search algorithm;

for each attribute that is common to all subscriber profile records in the working group, subdividing the working group into subgroups along the attribute, calculating a gain function reflecting the intra-group similarity and the inter-group differences of subscribers in the subgroups with respect to the values of the target attribute, and saving the results; and if the subgroups formed using the attribute that yielded the highest gain function meet a predetermined split criteria, replacing the working group in the subscriber portfolio model with the subgroups;

until the subscriber portfolio model meets predetermined stop criteria.

2. The method of claim 1 wherein obtaining a subscriber profile record associated with each subscriber comprises collecting traffic data and performance data of the subscriber as measured in the network of the operator, and retrieving subscriber records of the subscriber from databases of the operator.

3. The method of claim 2 further comprising correlating data collected from different sources based on a subscriber identifier.

4. The method of claim 2 further comprising removing subscriber identifiers from the subscriber profile record.

5. The method of claim 1 further comprising, after obtaining the subscriber profile records and prior to initializing the subscriber portfolio model, pre-processing each subscriber profile record to perform one or more actions selected from the group consisting of
- filtering or complementing the subscriber profile record to provide missing data;
- removing unnecessary attributes that exhibit strong correlation with other attributes; and
- creating derived attributes.

6. The method of claim 5 wherein creating derived attributes comprises calculating statistical relationships among selected attributes.

7. The method of claim 1 wherein selecting a target attribute comprises selecting a subscriber's total traffic in a predetermined duration as the target attribute.

8. The method of claim 1 wherein selecting a target attribute comprises selecting a subscriber's payment divided by the subscriber's total traffic in a predetermined duration as the target attribute.

9. The method of claim 1 wherein the search algorithm applied to select a working group is a depth-first search algorithm.

10. The method of claim 1 wherein subdividing the working group into subgroups along the selected attribute comprises, if the selected attribute is a nominal attribute:
- dividing the working group into as many subgroups as the number of different appearing values of the nominal attribute; and
- iteratively,
  - selecting the largest unmerged subgroup;
  - merging the selected subgroup with one or more other subgroups for which a similarity metric of the distribution of the target attribute between the selected subgroup and the other subgroup exceeds a predetermined threshold;
- until no more subgroups can be joined; and
- for each untouched subgroup remaining, merging the untouched subgroup with a previously-merged subgroup that has the closest target attribute average.

11. The method of claim 10 wherein the similarity metric is obtained based on a Student's t-test analysis.

12. The method of claim 1 wherein subdividing the working group into subgroups along the selected attribute comprises, if the selected attribute is a numeric attribute:
- sorting the subscribers in the working group along increasing or decreasing values of the numeric attribute; and
- estimating monotone regression of the target attribute along the numeric attribute;
- separating the working group into subgroups using intercepts of the monotone regression as subgroup separator points; and
- iteratively,
  - selecting the largest unmerged subgroup;
  - merging the selected subgroup with one or more other subgroups for which a similarity metric of the distribution of the target attribute between the selected subgroup and the other subgroup exceeds a predetermined threshold, under the constraint that only adjacent subgroups can be merged;
- until no more subgroups can be joined.

13. The method of claim 1 wherein the gain function is the square root of the summation, over the number of subgroups, of the product of the number of subscribers in a subgroup and the square of the differences of the average values of the target attribute for the subgroup and the working group, divided by the number of subscribers in the working group.

14. The method of claim 13, wherein the gain function is $$g = \sqrt{\frac{\sum_{i=1}^{l} n_i (m_i - m_p)^2}{n_p}}$$

where
$n_i, n_p$ are the number of subscribers in the $i^{th}$ subgroup and the working group, respectively;

$$m_i = \frac{1}{n_i} \sum_{j=1}^{n_i} t_{i,j}$$

is the average of the target attribute t in the $i^{th}$ subgroup; and
$m_p$ is the average of the target attribute t in the working group.

15. The method of claim 1 wherein the gain function is the square root of the summation, over the number of subgroups, of the square of the differences of the average values of the target attribute for the subgroup and the working group, divided by the number of subscribers in the working group.

16. The method of claim 15, wherein the gain function is $$g = \sqrt{\frac{\sum_{i=1}^{l} (m_i - m_p)^2}{n_p}}$$

where
$n_i, n_p$ are the number of subscribers in the $i^{th}$ subgroup and the working group, respectively;

$$m_i = \frac{1}{n_i} \sum_{j=1}^{n_i} t_{i,j}$$

is the average of the target attribute t in the $i^{th}$ subgroup; and
$m_p$ is the average of the target attribute t in the working group.

17. The method of claim 1 wherein the predetermined split criteria is that the sum of mean squared errors of values of the target attribute within a group compared to the average value of the target attribute within the group are below a predetermined threshold.

18. The method of claim 1 wherein a predetermined stop criterion is that the highest achievable value of the gain function applied in the attribute selection process is below a predetermined threshold.

19. The method of claim 1 wherein a predetermined stop criterion is that the size of the largest group is below a predetermined threshold.

20. A network operator analysis station operative to create a subscriber portfolio model of subscribers of a mobile communication network operator, the subscriber portfolio model comprising a plurality of mutually exclusive and completely exhaustive groups of subscribers, the groups exhibiting high intra-group similarity and inter-group differences with respect to a target attribute, and wherein each group is self-descriptive by the attributes used to create the groups, comprising:
- memory operative to store subscriber profile records;
- memory operative to store a subscriber portfolio analysis program;
- a network interface operative to collect subscriber information from one or more network nodes; and
- a processor operative to
    - obtain a subscriber profile record associated with each subscriber, the subscriber profile record comprising a plurality of pairs, each pair comprising an attribute and a value;
    - select a target attribute from the attributes common to all subscriber profile records;
    - initialize the subscriber portfolio model to include a subscriber group comprising all subscribers; and
    - iteratively perform the steps of
        - selecting a working group from the at least one subscriber group in the subscriber portfolio model by applying a search algorithm;
        - for each attribute that is common to all subscriber profile records in the working group, subdividing the working group into subgroups along the attribute, calculating a gain function reflecting the intra-group similarity and the inter-group differences of subscribers in the subgroups with respect to the values of the target attribute, and saving the results; and
        - if the subgroups formed using the attribute that yielded the highest gain function meet a predetermined split criteria, replacing the working group in the subscriber portfolio model with the subgroups;
    - until the subscriber portfolio model meets predetermined stop criteria.

21. The analysis station of claim 20 wherein the processor is further operative to remove subscriber identifiers from the subscriber profile records.

22. The analysis station of claim 20 wherein the processor is further operative to pre-process each subscriber profile record to perform one or more actions selected from the group consisting of
- filtering or complementing the subscriber profile record to provide missing data;
- removing unnecessary attributes that exhibit strong correlation with other attributes; and
- creating derived attributes;
- after obtaining the subscriber profile records and prior to initializing the subscriber portfolio model.

23. The analysis station of claim 20 wherein the target attribute comprises a subscriber's total traffic in a predetermined duration.

24. The analysis station of claim 20 wherein the target attribute comprises a subscriber's payment divided by the subscriber's total traffic in a predetermined duration.

25. The analysis station of claim 20 wherein the processor is operative to subdivide the working group into subgroups along the selected attribute by, if the selected attribute is a nominal attribute:
- dividing the working group into as many subgroups as the number of different appearing values of the nominal attribute; and
- iteratively,
    - selecting the largest unmerged subgroup;
    - merging the selected subgroup with one or more other subgroups for which a similarity metric of the distribution of the target attribute between the selected subgroup and the other subgroup exceeds a predetermined threshold;
- until no more subgroups can be joined; and
- for each untouched subgroup remaining, merging the untouched subgroup with a previously-merged subgroup that has the closest target attribute average.

26. The analysis station of claim 20 wherein the processor is operative to subdivide the working group into subgroups along the selected attribute by, if the selected attribute is a numeric attribute:
- sorting the subscribers in the working group along increasing or decreasing values of the numeric attribute; and
- estimating monotone regression of the target attribute along the numeric attribute;
- separating the working group into subgroups using intercepts of the monotone regression as subgroup separator points; and
- iteratively,
    - selecting the largest unmerged subgroup;
    - merging the selected subgroup with one or more other subgroups for which a similarity metric of the distribution of the target attribute between the selected subgroup and the other subgroup exceeds a predetermined threshold, under the constraint that only adjacent subgroups can be merged;
- until no more subgroups can be joined.

* * * * *

UNITED STATES PATENT AND TRADEMARK OFFICE
CERTIFICATE OF CORRECTION

| | | |
|---|---|---|
| PATENT NO. | : 8,594,623 B2 | Page 1 of 1 |
| APPLICATION NO. | : 13/357917 | |
| DATED | : November 26, 2013 | |
| INVENTOR(S) | : Kovacs et al. | |

It is certified that error appears in the above-identified patent and that said Letters Patent is hereby corrected as shown below:

In the Specification

In Column 7, Line 35, delete "(Le.," and insert -- (i.e., --, therefor.

Signed and Sealed this
Twenty-ninth Day of July, 2014

Michelle K. Lee
*Deputy Director of the United States Patent and Trademark Office*